US008909397B2

(12) United States Patent
Aridome et al.

(10) Patent No.: US 8,909,397 B2
(45) Date of Patent: Dec. 9, 2014

(54) CONTROL APPARATUS AND CONTROL METHOD FOR HYBRID VEHICLE

(75) Inventors: Koji Aridome, Toyota (JP); Takahiko Nakagawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 914 days.

(21) Appl. No.: 12/449,550

(22) PCT Filed: Feb. 29, 2008

(86) PCT No.: PCT/JP2008/054110
§ 371 (c)(1),
(2), (4) Date: Aug. 13, 2009

(87) PCT Pub. No.: WO2008/117648
PCT Pub. Date: Oct. 2, 2008

(65) Prior Publication Data
US 2010/0087976 A1  Apr. 8, 2010

(30) Foreign Application Priority Data
Mar. 28, 2007  (JP) .................................. 2007-085326

(51) Int. Cl.
*B60L 9/00* (2006.01)
(Continued)

(52) U.S. Cl.
CPC ................. *B60K 6/445* (2013.01); *B60K 6/365* (2013.01); *B60K 6/405* (2013.01); *B60K 28/10* (2013.01); *B60L 3/0046* (2013.01); *B60L 3/0092* (2013.01); *B60L 3/04* (2013.01); *B60L 11/123* (2013.01); *B60L 11/14* (2013.01); *B60L 11/1861* (2013.01); *B60L 11/1866* (2013.01); *B60L 11/187* (2013.01); *B60L 11/1872* (2013.01); *B60L 11/1874* (2013.01); *B60L 11/1879* (2013.01); *B60W 10/06* (2013.01); *B60W 10/08* (2013.01); *B60W 10/26* (2013.01); *B60W 20/00* (2013.01); *B60K 1/02* (2013.01); *B60K 2001/003* (2013.01); *B60K 2001/005* (2013.01); *B60L 2240/36* (2013.01); *B60W 2510/246* (2013.01); *Y02T 10/6217* (2013.01); *Y02T 10/6239* (2013.01); *Y02T 10/6286* (2013.01); *Y02T 10/7005* (2013.01); *Y02T 10/7044* (2013.01); *Y02T 10/7061* (2013.01); *Y02T 10/7077* (2013.01)
USPC ................ 701/22; 701/36; 701/86; 180/65.1; 180/65.21; 180/65.265; 180/65.29; 477/72; 477/73

(58) Field of Classification Search
USPC .................... 701/22, 36, 86; 180/65.1, 65.21, 180/65.265, 65.29; 477/5, 6, 72, 73
See application file for complete search history.

(56) References Cited

U.S. PATENT DOCUMENTS 6,242,873 B1 * 6/2001 Drozdz et al. ................. 318/139
6,424,157 B1 * 7/2002 Gollomp et al. .............. 324/430
(Continued)

FOREIGN PATENT DOCUMENTS

DE   10 2004 057 828 A1   6/2006
EP   1 870 289 A1   12/2007
(Continued)

OTHER PUBLICATIONS

European Search Report issued in Application No. 08 72 1528; Dated Mar. 1, 2011.

*Primary Examiner* — Khoi Tran
*Assistant Examiner* — Jaime Figueroa
(74) *Attorney, Agent, or Firm* — Oliff PLC

(57) ABSTRACT

When an abnormality except for a temperature abnormality of a travel-purpose battery is detected, a battery of the present invention renders a system main relay to make a change to a battery-less travel mode while using a battery cooling fan to cool the travel-purpose battery. When a temperature abnormality of the travel-purpose battery is still detected, a system-off command signal is output to cause the hybrid vehicle to become unable to travel. In this way, limp home mode and system shutoff of the hybrid vehicle can be surely implemented even in the case where an abnormality occurs to the travel-purpose battery.

6 Claims, 12 Drawing Sheets

(51) Int. Cl.

| | |
|---|---|
| *B60L 11/00* | (2006.01) |
| *G05F 1/00* | (2006.01) |
| *G05D 3/00* | (2006.01) |
| *G06F 7/00* | (2006.01) |
| *G06F 17/00* | (2006.01) |
| *B60K 6/445* | (2007.10) |
| *B60K 6/365* | (2007.10) |
| *B60K 6/405* | (2007.10) |
| *B60K 28/10* | (2006.01) |
| *B60L 3/00* | (2006.01) |
| *B60L 3/04* | (2006.01) |
| *B60L 11/12* | (2006.01) |
| *B60L 11/14* | (2006.01) |
| *B60L 11/18* | (2006.01) |
| *B60W 10/06* | (2006.01) |
| *B60W 10/08* | (2006.01) |
| *B60W 10/26* | (2006.01) |
| *B60W 20/00* | (2006.01) |
| *B60K 1/02* | (2006.01) |
| *B60K 1/00* | (2006.01) |

(56) References Cited

U.S. PATENT DOCUMENTS

| | | | |
|---|---|---|---|
| 6,575,258 B1 * | 6/2003 | Clemmer | 180/68.5 |
| 6,932,738 B2 * | 8/2005 | Aoki et al. | 477/5 |
| 7,999,505 B2 * | 8/2011 | Bertness | 320/104 |
| 2002/0163199 A1 * | 11/2002 | Ramaswamy et al. | 290/40 C |
| 2003/0000758 A1 | 1/2003 | Bruck et al. | |
| 2004/0063394 A1 | 4/2004 | Brenner et al. | |
| 2004/0084234 A1 | 5/2004 | Yatabe et al. | |
| 2004/0147366 A1 | 7/2004 | Aoki et al. | |
| 2007/0093954 A1 * | 4/2007 | Malone et al. | 701/112 |
| 2007/0233334 A1 * | 10/2007 | Kozarekar | 701/22 |

FOREIGN PATENT DOCUMENTS

| | | |
|---|---|---|
| GB | 2 341 830 A | 3/2000 |
| JP | A-2000-166020 | 6/2000 |
| JP | A-2000-166024 | 6/2000 |
| JP | A-2001-25103 | 1/2001 |
| JP | A-2001-329884 | 11/2001 |
| JP | A-2004-159412 | 6/2004 |
| JP | A-2006-129567 | 5/2006 |
| JP | A-2007-30650 | 2/2007 |

* cited by examiner

F I G. 1
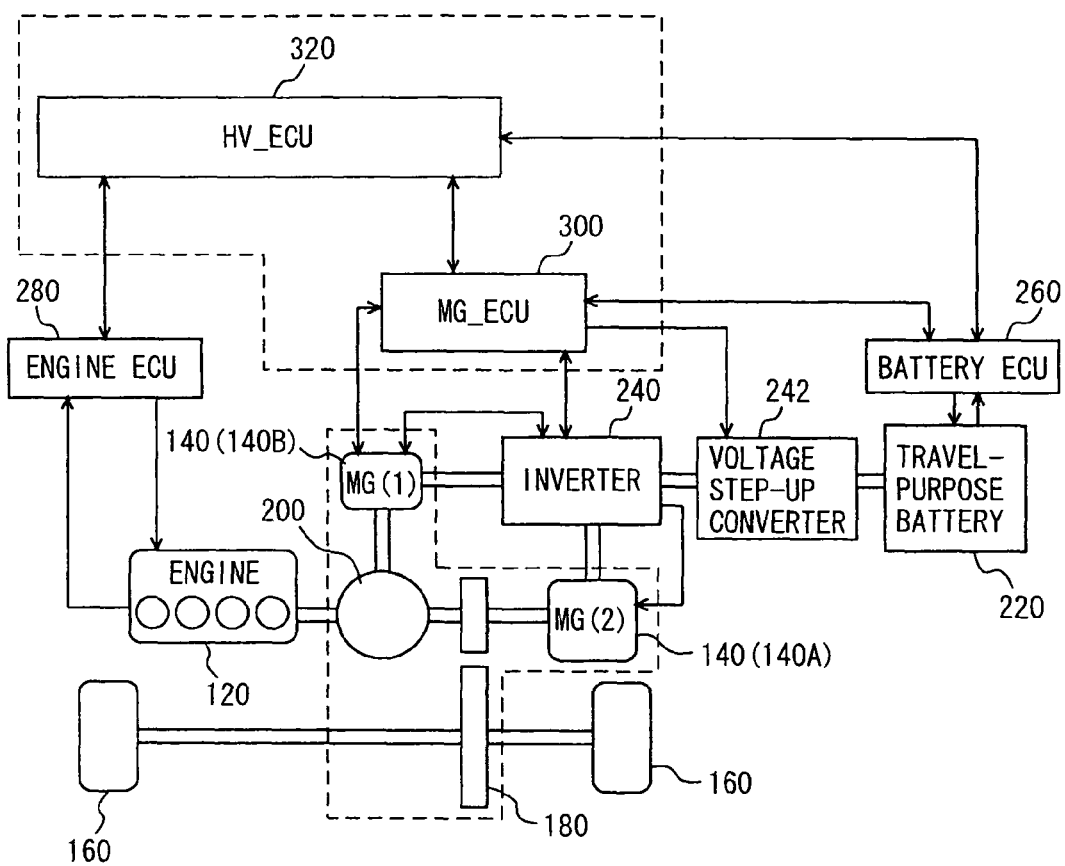

F I G. 5
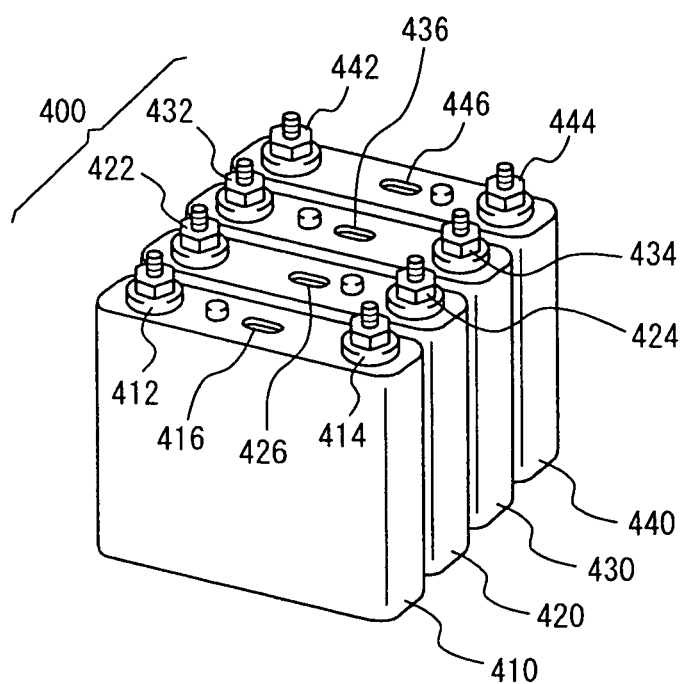

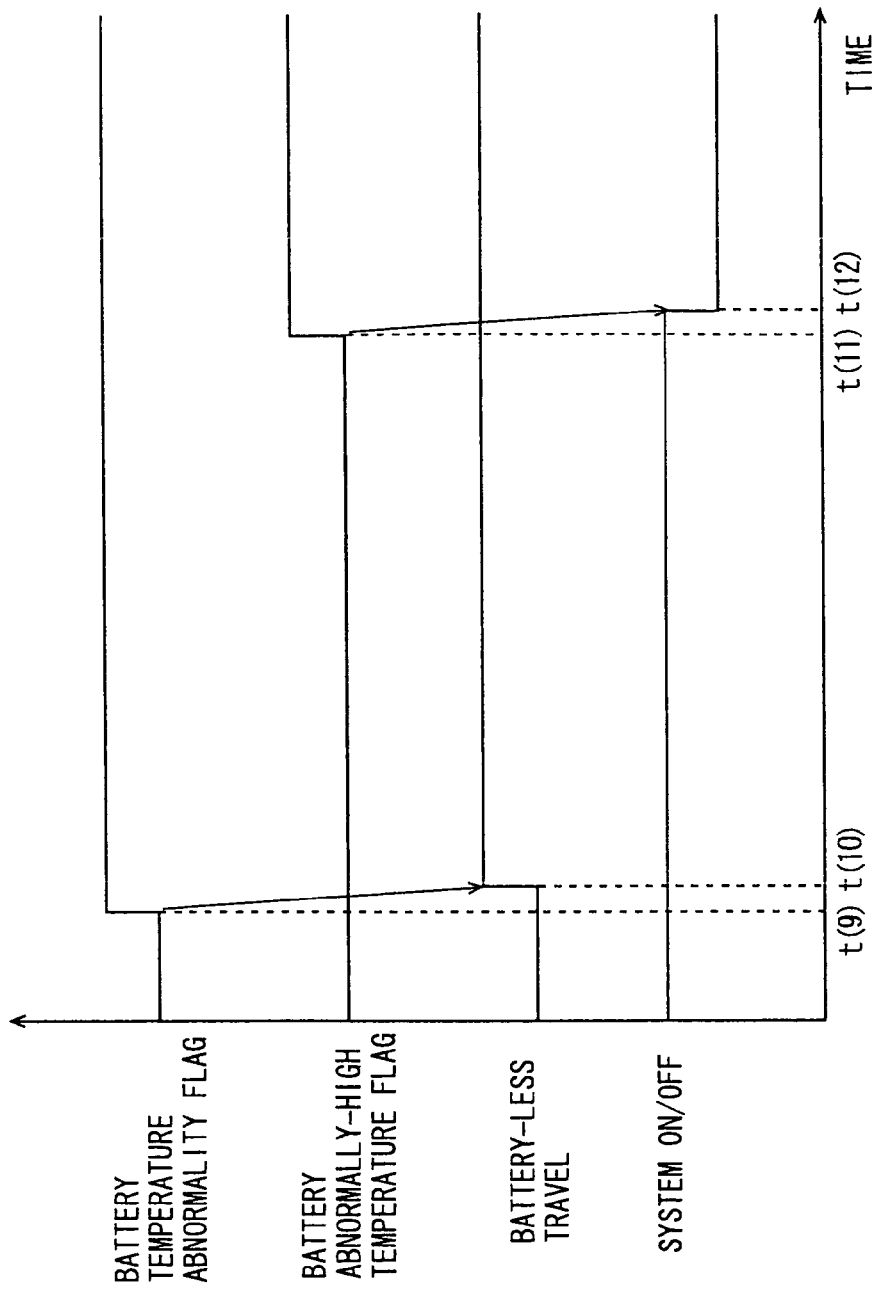

CONTROL APPARATUS AND CONTROL METHOD FOR HYBRID VEHICLE

TECHNICAL FIELD

The present invention relates to a hybrid vehicle, and particularly to limp home mode and system shutoff of the hybrid vehicle that are effected when an abnormality occurs to a travel-purpose power storage mechanism (such as battery and capacitor) which serves to cause the vehicle to travel.

BACKGROUND ART

A vehicle has been developed and has become commercially practical that is mounted with a powertrain called hybrid system combining an internal combustion engine (any known engine such as gasoline engine or diesel engine may be used for example) with an electrical motor. Such a vehicle is mounted with electrical devices including a secondary battery for driving a travel-purpose electrical motor which serves to cause the vehicle to travel, as well as an electric power conversion device (PCU (Power Control Unit)) such as inverter and DC/DC converter. The secondary battery is discharged and charged through a chemical reaction. The chemical reaction is accompanied by heat generation, and therefore, the secondary battery has to be cooled. In the inverter and the DC/DC converter as well, heat is generated from power elements. Therefore, the inverter and the DC/DC converter also have to be cooled. In the electrical devices, generally Joule heat is generated when electric current flows through an electric power line. It is therefore necessary to cool the electrical devices.

The electrical devices (such as secondary battery (battery) and PCU) are in some cases disposed for example under the backseat of the vehicle or between the backseat and the luggage area of the vehicle. The electrical devices are placed in a casing connected to a duct serving as an air passage. On the upstream (or may be downstream) side of the intake airflow with respect to the electrical devices in the casing, a cooling fan generating a cooling air for cooling the electrical devices is provided. Since the upstream end of the casing communicates with the vehicle interior (specifically communicates with the vehicle interior through an intake opening of a duct provided on the floor panel in front of the backseat or an intake opening in a rear package tray). Therefore, the electrical devices are cooled by the air within the vehicle interior.

For the secondary battery, a nickel-metal hydride battery or lithium-ion battery for example is used. Regarding such a secondary battery (the following example of the battery pack refers to the one using the nickel-metal hydride battery), the output voltage per cell is approximately 1.2 V. Six cells are series-connected to configure a battery module with an output voltage of 7.2 V. The secondary battery is mounted on the vehicle in the form of a battery pack with an output voltage of 216 V to 288 V configured by series-connecting 30 to 40 battery modules. The battery pack is divided into three to five battery units to be mounted on the floor panel of the vehicle or under the floor of the luggage area.

Since the hybrid vehicle has to be mounted with such electrical devices as described above in addition to the engine, it is difficult to provide a cooling passage such that the cells of the secondary battery with a large volume are equally cooled.

The secondary battery is controlled using SOC (State Of Charge) representing the remaining capacity of the battery, such that SOC is kept in a predetermined range. In the vehicle caused to travel by driving the electrical motor using electric power from the secondary battery, the quantity of electric power that can be input/output to/from the secondary battery has a significant influence on the traveling performance of the vehicle. Due to various factors, the quantity of electric power that can be input/output to/from the secondary battery varies. The battery temperature is one of the influential factors. It is therefore important to manage the temperature of the secondary battery. Further, if any abnormality occurs, the temperature of such a secondary battery could become abnormally high. Thus, the hybrid vehicle travels while whether or not an abnormality occurs is monitored.

Japanese Patent Laying-Open No. 2001-25103 discloses a drive apparatus for a hybrid vehicle that can ensure the main-battery (travel-purpose battery serving to cause the vehicle to travel) protection capability while avoiding deterioration in vehicle traveling capability. The drive apparatus for the hybrid vehicle disclosed in this publication includes: an engine; a main battery; an energy transmission apparatus controlling supply and receipt of energy between the engine, the main battery and a vehicle driveshaft, converting engine power into electric power to charge the main battery, and converting the electric power of the main battery into motive power to start the engine; a control apparatus controlling the energy transmission apparatus; a battery abnormality detection apparatus detecting an abnormality of the main battery; and a switch apparatus opening and closing an electrical transmission passage between the main battery and the energy transmission apparatus. The control apparatus has a feature as follows. When an abnormality of the main battery is detected while the engine is stopped in spite of vehicle travel mode, the control apparatus gives an instruction to start the engine, inhibits charge/discharge of the main battery by breaking the switch apparatus after the start of the engine is completed, inhibits the engine from being stopped in the vehicle travel mode, and operates the energy transmission apparatus in a control mode which does not involve supply and receipt of electric power from and to the main battery.

In the case where an abnormality occurs to the main battery while the vehicle is in the travel mode, the drive apparatus for the hybrid vehicle always disconnects the main battery after the engine operating state has been established, and therefore, the following problem does not occur. The problem is specifically that the vehicle cannot travel using the engine because the main battery is disconnected since an abnormality occurs to the main battery while the engine is stopped.

The drive apparatus for the hybrid vehicle disclosed in Japanese Patent Laying-Open No. 2001-25103 as described above causes the hybrid vehicle to travel using the engine, regardless of what abnormality occurs to the main battery. For example, there could be the case where, even if the charge and discharge of the main battery are inhibited, a chemical reaction of the secondary battery is proceeding. Japanese Patent Laying-Open No. 2001-25103 does not mention the problem that the hybrid vehicle continues traveling in such a case as described above.

DISCLOSURE OF THE INVENTION

The present invention has been made for solving the above-described problems, and an object of the invention is to provide a control apparatus and a control method for a hybrid vehicle with which limp home mode and system shutoff can be surely implemented when an abnormality occurs to a travel-purpose power storage mechanism serving to cause the vehicle to travel.

A control apparatus for a hybrid vehicle according to an aspect of the present invention is a control apparatus for a hybrid vehicle including an internal combustion engine and an electrical motor each as a travel source for the vehicle and including a power storage mechanism supplying electric power to the electrical motor. The control apparatus includes: a detection unit for detecting an abnormality of the power storage mechanism; a vehicle control unit for controlling the vehicle such that the power storage mechanism is electrically disconnected from an electrical load including the electrical motor and the vehicle travels using the internal combustion engine as the travel source instead of the electrical motor, when the detection unit detects an abnormality of the power storage mechanism; and an inhibition unit for inhibiting the vehicle from traveling using the internal combustion engine, when another abnormality of the power storage mechanism is detected while the vehicle is traveling using the internal combustion engine instead of the electrical motor.

In this configuration, when an abnormality is detected in a secondary battery or capacitor serving as the power storage mechanism supplying electric power to the electrical motor, the control apparatus controls the vehicle such that the power storage mechanism whose abnormality is detected is electrically disconnected from an electrical load including the electrical motor and the vehicle travels using the internal combustion engine as the travel source instead of the electrical motor. Accordingly, there is no charge/discharge power to/from the power storage mechanism and thus an abnormality of the power storage mechanism caused by charge/discharge should not occur. If another abnormality of the power storage mechanism is still detected while the vehicle is traveling using the internal combustion engine instead of the electrical motor, the control apparatus inhibits the vehicle from traveling using the internal combustion engine. In other words, from the fact that an abnormality of the power storage mechanism is detected and hence the power storage mechanism is no longer used but another abnormality of the power storage mechanism still occurs, it is seen that a serious abnormality occurs to the power storage mechanism. Accordingly, the control apparatus inhibits the vehicle from traveling with the internal combustion engine to stop the hybrid vehicle. In this way, a critical failure (failure that cannot be corrected easily) can be prevented from occurring due to the serious abnormality. Thus, the control apparatus for the hybrid vehicle can be provided that can surely effect limp home mode travel and system shutoff of the hybrid vehicle when an abnormality occurs to the travel-purpose power storage mechanism.

Preferably, the inhibition unit inhibits the vehicle from traveling using the internal combustion engine, when another abnormality of the power storage mechanism is detected that is different from the abnormality of the power storage mechanism detected by the detection unit.

In this configuration, from the fact that an abnormality of the power storage mechanism is detected and hence the power storage mechanism is no longer used but another abnormality different from the detected abnormality occurs to the power storage mechanism, it is seen that a serious abnormality occurs to the power storage mechanism. Accordingly, the control apparatus inhibits the vehicle from traveling using the internal combustion engine to stop the hybrid vehicle. In this way, a critical failure (failure that cannot be corrected easily) can be prevented from occurring due to the serious abnormality.

Preferably, the inhibition unit inhibits the vehicle from traveling using the internal combustion engine, when a temperature abnormality of the power storage mechanism is detected that is different from the abnormality of the power storage mechanism detected by the detection unit.

In this configuration, from the fact that an abnormality of the power storage mechanism is detected and hence the power storage mechanism is no longer used but another abnormality relevant to the temperature and different from the detected abnormality occurs to the power storage mechanism, it is seen that a serious temperature abnormality occurs to the power storage mechanism. Accordingly, the control apparatus inhibits the vehicle from traveling using the internal combustion engine to stop the hybrid vehicle. In this way, a critical state (state that cannot be corrected easily) can be prevented from occurring due to the serious temperature abnormality.

Preferably, the detection unit detects an abnormality except for a temperature abnormality of the power storage mechanism. The inhibition unit inhibits the vehicle from traveling using the internal combustion engine, when a temperature abnormality of the power storage mechanism is detected.

In this configuration, from the fact that an abnormality except for a temperature abnormality of the power storage mechanism is detected and hence the power storage mechanism is no longer used but another abnormality relevant to the temperature occurs to the power storage mechanism, it is seen that a serious temperature abnormality occurs to the power storage mechanism. Accordingly, the control apparatus inhibits the vehicle from traveling using the internal combustion engine to stop the hybrid vehicle. In this way, a critical state (state that cannot be corrected easily) can be prevented from occurring due to the serious temperature abnormality.

Preferably, the detection unit detects a temperature abnormality of the power storage mechanism. The inhibition unit inhibits the vehicle from traveling using the internal combustion engine, when another temperature abnormality of the power storage mechanism is detected.

In this configuration, from the fact that a temperature abnormality of the power storage mechanism is detected and hence the power storage mechanism is no longer used but another temperature abnormality occurs to the power storage mechanism, it is seen that a serious temperature abnormality occurs to the power storage mechanism. Accordingly, the control apparatus inhibits the vehicle from traveling using the internal combustion engine to stop the hybrid vehicle. In this way, a critical state (state that cannot be corrected easily) can be prevented from occurring due to the serious temperature abnormality.

Preferably, the control apparatus further includes a cooling control unit for controlling a cooling apparatus mounted on the vehicle such that the cooling apparatus uses a maximum capacity to cool the power storage mechanism while the vehicle is traveling using the internal combustion engine as the travel source instead of the electrical motor.

In this configuration, when an abnormality of the power storage mechanism is detected, the power storage mechanism whose abnormality is detected is electrically disconnected from an electrical load including the electrical motor and hence the vehicle travels using the internal combustion engine as a travel source instead of the electrical motor. At this time, the control apparatus controls the cooling apparatus such that the cooling apparatus uses the maximum capacity to cool the power storage mechanism. Accordingly, there is no charge/discharge power to/from the power storage mechanism and the power storage mechanism is cooled with the maximum capacity of the cooling apparatus. Therefore, the state can be generated where no temperature abnormality of the power storage mechanism occurs. Therefore, the vehicle can travel in limp home mode using the engine as a travel source for a maximum possible period of time. Further, from the fact that the power storage mechanism is not used while cooled but another abnormality still occurs to the power storage mechanism, it is seen that a serious temperature abnormality occurs to the power storage mechanism. Accordingly, the control apparatus inhibits the vehicle from traveling using the internal combustion engine to stop the hybrid vehicle. In this way, a critical state (state that cannot be corrected easily) can be prevented from occurring due to the serious temperature abnormality.

BRIEF DESCRIPTION OF THE DRAWINGS

FIG. 1 is a control block diagram of the whole hybrid vehicle including a control apparatus according to an embodiment of the present invention.

FIG. 5 is a partially enlarged view of FIG. 4.

FIG. 12 is a timing chart showing an operation of the hybrid vehicle when the flowchart shown in FIG. 11 is executed.

BEST MODES FOR CARRYING OUT THE INVENTION

Figure 2:
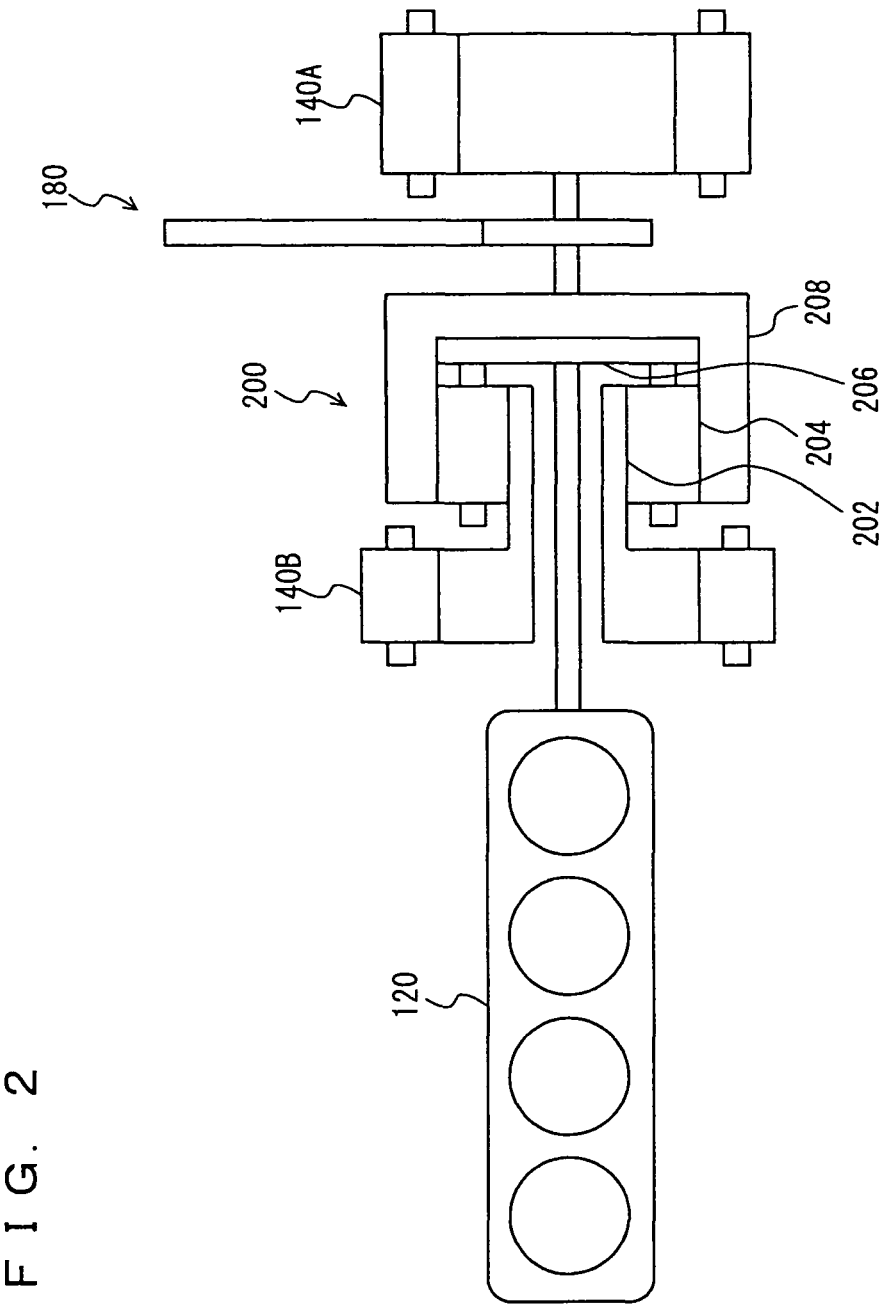
FIG. 2 is a diagram showing a power split device.

Embodiments of the present invention will be hereinafter described with reference to the drawings. In the following description, like components are denoted by like reference characters. They are named identically and function identically as well. Therefore, a detailed description thereof will not be repeated.

Referring to FIG. 1, a description will be given of a control block diagram of the whole hybrid vehicle including a control apparatus according to the present embodiment. The present invention is not limited to the hybrid vehicle shown in FIG. 1. The present invention may be applied to a vehicle where an internal combustion engine serving as a motive power source (an internal combustion engine such as gasoline engine for example, and the internal combustion engine will be described as an engine hereinafter) is a drive source (travel source) causing the vehicle to travel and is also a drive source for a generator. The present invention is further applicable to a vehicle having an engine and a motor generator each as a drive source and capable of traveling using motive power from the motor generator (while stopping the engine or without stopping the engine), or may be a hybrid vehicle mounted with a travel-purpose battery which serves to cause the vehicle to travel and operating in another manner (the present invention is not limited to hybrid vehicles such as so-called series and parallel hybrid vehicles).

This battery refers to a battery such as nickel-metal hydride battery or lithium-ion battery, and the type of the battery is not limited to a particular one. The power storage mechanism may be a capacitor instead of the battery. In the following, it is supposed that the power storage mechanism is a battery and the type of the battery is the lithium-ion battery. Since the lithium-ion battery has a high operating voltage and a high energy density per weight and volume, the battery can be made lightweight and compact. Further, the lithium-ion battery is advantageous in that the lithium-ion battery has no memory effect. A detailed description of the battery configuration will be given hereinlater.

The hybrid vehicle includes an engine 120 and a motor generator (MG) 140. For convenience of description, motor generator 140 will be hereinafter expressed as a motor generator 140A (or MG (2) 140A) and a motor generator 140B (or MG (1) 140B). Depending on the traveling state of the hybrid vehicle, however, motor generator 140A may serve as a generator and motor generator 140B may serve as a motor. When the motor generator serves as a generator, regenerative braking is performed. When the motor generator serves as the generator, the kinetic energy of the vehicle is converted into electrical energy and the vehicle is decelerated.

The hybrid vehicle additionally includes: a reduction unit 180 transmitting the motive power generated by engine 120 or motor generator 140 to drive wheels 160, or transmitting the drive of drive wheels 160 to engine 120 or motor generator 140; a power split device (planetary gear train for example described hereinlater) 200 splitting the motive power generated by engine 120 into the one to drive wheels 160 and the one to motor generator 140B (MG (1) 140B); a travel-purpose battery 220 charged with electric power for driving motor generator 140; an inverter 240 controlling the electric current while making a conversion between the DC of travel-purpose battery 220 and the AC of motor generator 140A (MG (2) 140A) and motor generator 140B (MG (1) 140B); a battery control unit (hereinafter referred to as battery ECU (Electronic Control Unit)) 260 managing and controlling the state of charge/discharge (such as SOC) of travel-purpose battery 220; an engine ECU 280 controlling the operating state of engine 120, an MG_ECU 300 controlling for example motor generator 140, battery ECU. 260 and inverter 240 according to the state of the vehicle; and an HV_ECU 320 controlling the whole hybrid system by managing and controlling battery ECU 260, engine ECU 280 and MG_ECU 300 with respect to each other, so that the hybrid vehicle can operate most efficiently. Here, SOC is calculated by the current integration or measuring the open circuit voltage (OCV).

In the present embodiment, a voltage step-up converter 242 is provided between travel-purpose battery 220 and inverter 240. This is for the reason that the rated voltage of travel-purpose battery 220 is lower than the rated voltage of motor 140A (MG (2) 140A) or motor generator 140B (MG (1) 140B). When the electric power is supplied from travel-purpose battery 220 to motor generator 140A (MG (2) 140A) or motor generator 140B (MG (1) 140B), the electric power is boosted by voltage step-up converter 242.

While the ECUs in FIG. 1 are configured separately, an ECU may be configured by integrating two or more ECUs (for example, as indicated by the dotted line in FIG. 1, an ECU may be provided by integrating MG_ECU 300 and HV_ECU 320).

As power split device 200, a planetary gear train (planetary gear) is used for distributing the motive power of engine 120 to both of drive wheels 160 and motor generator 140B (MG (1) 140B). The number of revolutions of motor generator 140B (MG (1) 140B) is controlled to allow power split device 200 to also serve as a continuously variable transmission. The rotational force of engine 120 is input to a carrier (C), and is transmitted to motor generator 140B (MG (1) 140B) by a sun gear (S) and to motor generator 140A (MG (2) 140) and an output shaft (drive wheels 160 side) by a ring gear (R). In order to stop rotating engine 120, the kinetic energy of the rotating engine 120 is converted by motor generator 140B (MG (1) 140B) into electrical energy to reduce the speed of engine 120.

In the hybrid vehicle mounted with the hybrid system as shown in FIG. 1, when a predetermined condition concerning the state of the vehicle is satisfied, HV_ECU 320 controls engine 120 via motor generator 140A (MG (2) 140A) and engine ECU 280 such that the hybrid vehicle travels using only motor generator 140A (MG (2) 140A) of motor generator 140. The predetermined condition refers for example to a condition that SOC of travel-purpose battery 220 has a predetermined value or more. In this way, the hybrid vehicle can run using only motor generator 140A (MG (2) 140A) when started or traveling at a low speed and the efficiency of engine 120 is low. As a result, SOC of travel-purpose battery 220 can be reduced (travel-purpose battery 220 can be charged when the vehicle is thereafter stopped).

In a normal-travel mode, the motive power of engine 120 is split into those for two paths respectively, by power split device 200 for example. One of the two portions of the motive power directly drives drive wheels 160. The other of the motive power drives motor generator 140B (MG (1) 140B) so that motor generator 140B (MG (1) 140B) generates electric power. The electric power generated at this time is used by motor generator 140A (MG (2) 140A) for assisting the drive of drive wheels 160. When the vehicle is traveling at a high speed, the electric power from travel-purpose battery 220 is further supplied to motor generator 140A (MG (2) 140A) to increase the output of motor generator 140A (MG (2) 140A) and accordingly motor generator 140A (MG (2) 140A) adds the drive force for drive wheels 160. In contrast, when the vehicle is decelerated, motor generator 140A (MG (2) 140A) operated according to drive wheels 160 serves as a generator so that regenerative braking is performed. The recovered electric power is stored in travel-purpose battery 220. When the charge quantity of travel-purpose battery 220 decreases and accordingly charge becomes particularly necessary, the output of engine 120 is increased. Accordingly, the quantity of electric power generated by motor generator 140B (MG (1) 140B) is increased, and accordingly the charge quantity for travel-purpose battery 220 is increased.

The target SOC of travel-purpose battery 220 is normally set to approximately 60% so that the battery can store the recovered energy at any time the regenerative braking is performed. The upper limit and the lower limit of SOC are set for example to 80% and 30% respectively for the purpose of suppressing deterioration of travel-purpose battery 220. HV_ECU 320 controls the power generation and regenerative braking by motor generator 140 as well as the motor output via MG_ECU 300 so that SOC will not exceed the upper limit and the lower limit. The values indicated here are given by way of an example, not by limitation.

Referring to FIG. 2, power split device 200 will be further described. Power split device 200 is formed of a planetary gear set including a sun gear (S) 202 (hereinafter simply referred to as sun gear 202), a pinion gear 204, a carrier (C) 206 (hereinafter simply referred to as carrier 206), a ring gear (R) 208 (hereinafter simply referred to as ring gear 208).

Pinion gear 204 meshes with sun gear 202 and ring gear 208. Carrier 206 supports pinion gear 204 so that pinion gear 204 can rotate on its axis. Sun gear 202 is coupled to the rotational shaft of MG (1) 140B. Carrier 206 is coupled to the crankshaft of engine 120. Ring gear 208 is coupled to the rotational shaft of MG (2) 140A and to reduction unit 180.

Engine 120, MG (1) 140B and MG (2) 140A are coupled via power split device 200 formed of the planetary gear set, so that respective numbers of revolutions of engine 120, MG (1) 140B and MG (2) 140A are connected linearly in a nomograph.

Figure 3:
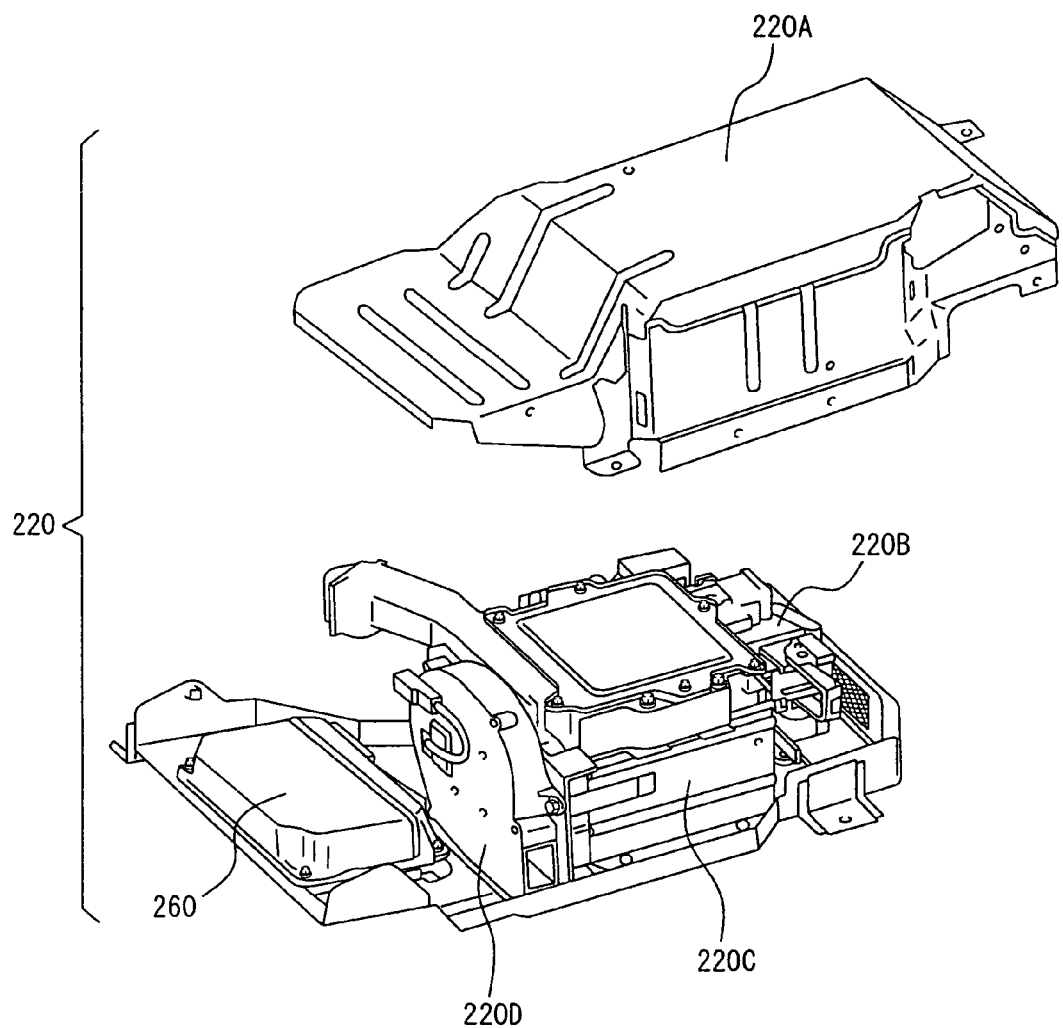
FIG. 3 is an entire perspective view of a travel-purpose battery according to an embodiment of the present invention.

Referring to FIG. 3, travel-purpose battery 220 in FIG. 1 will be described. The type of battery used for forming this travel-purpose battery 220 is the lithium-ion battery as described above.

Travel-purpose battery 220 shown in FIG. 3 is disposed for example under a seat of the vehicle or under a sheet of the luggage area (on the floor panel). Travel-purpose battery 220 is formed of a battery pack cover 220A, a junction block 220B, a lithium-ion battery (battery pack) 220C, an electrical battery cooling fan 220D, and battery ECU 260.

Junction block 220B is a connecting portion of any line connecting for example lithium-ion battery 220C to the motor generator via the DC/DC converter and inverter. Junction block 220B serves not only to connect electrical lines but also to branch any electrical line in some cases.

Lithium-ion battery 220C generally uses a lithium-contained compound such as cobalt-based lithium, nickel-based lithium or lithium manganate for the positive electrode, a carbon material without containing lithium for the negative electrode, a lithium salt dissolved in an organic solvent as the electrolyte, and lithium as ions. In particular, the battery using a nickel-based lithium for the positive electrode can have an extended life under a high temperature and an increased output and an extended lifetime under a low temperature can also be achieved by suppressing deterioration reaction at the interface between the electrolyte and the electrode. Such a lithium-ion battery 220C has a high operating voltage as well as a high energy density per weight and volume, so that the battery can be easily made lightweight and compact.

Electrical battery cooling fan 220D cools lithium-ion battery 220C when the temperature of lithium-ion battery 220C is high. Lithium-ion battery 220C exhibits the maximum performance around room temperature. Therefore, when the temperature measured by a battery temperature sensor is higher than a predetermined threshold, lithium-ion battery 220C is cooled by electrical battery cooling fan 220D in order to keep the battery performance. Electrical battery cooling fan 220D uses the air in the vehicle as a cooling media to cool lithium-ion battery 220C. The number of revolutions of the electrical motor is controlled so that the ability of electrical battery cooling fan 220D can be changed.

Battery ECU 260 manages the charge and discharge of lithium-ion battery 220C and performs a process for addressing an abnormality. In order to set SOC of lithium-ion battery 220C to an appropriate value, battery ECU 260 performs SOC management control, SOC equalization management control and battery temperature control.

The SOC management control refers to control for managing SOC of lithium-ion battery 220C according to the traveling state of the vehicle. Under the SOC management control, SOC is managed in such a manner that allows the battery to be charged with the electric power generated by the motor generator when the regenerative braking is performed (namely a manner that prevents the full-charge state).

The SOC equalization management control refers to control performed when a plurality of electric cells (battery cells) are used as a set of the battery pack, for equalizing respective SOCs of the battery cells. By the equalization of respective SOCs of the battery cells, SOC of the battery pack as a collective battery can be used to the maximum extent, and the stored electric power can be effectively used. Accordingly, under the SOC equalization management control, when respective SOCs of battery cells are different from each other, the SOCs are equalized by discharging battery cells except for a battery cell of the lowest SOC, according to the lowest SOC.

Lithium-ion battery 220C exhibits the maximum performance around room temperature. Under the battery temperature control, when the temperature of lithium-ion battery 220C increases, electrical battery cooling fan 220D is used to cool lithium-ion battery 220C so as to reduce the battery temperature to an optimum temperature.

Figure 4:
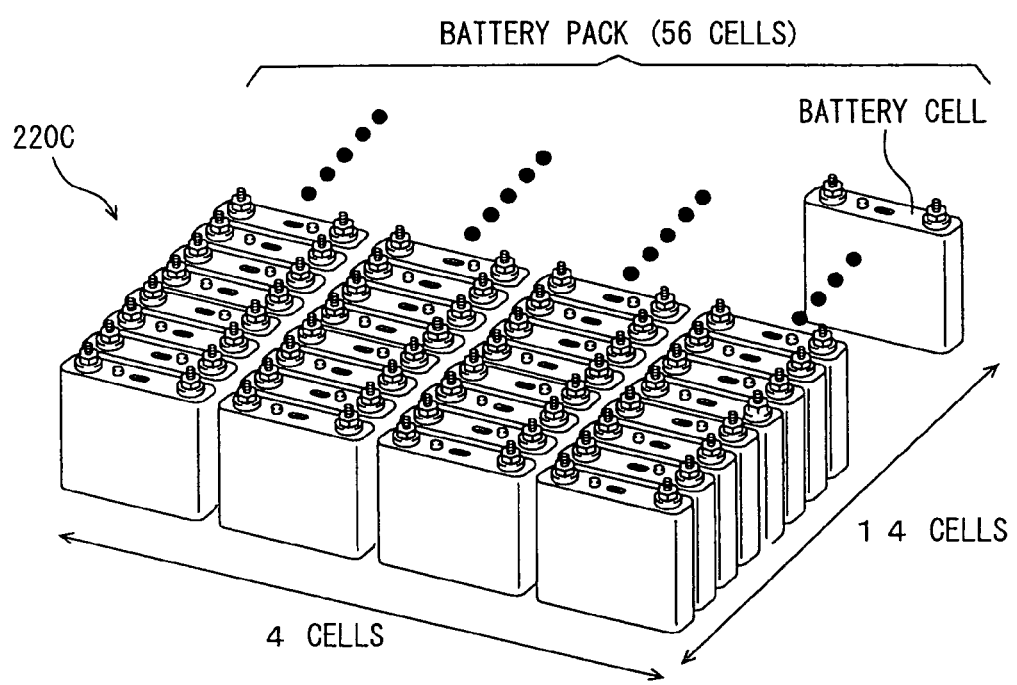
FIG. 4 is an entire perspective view of a battery pack configured using a lithium-ion battery.

FIG. 4 shows an internal configuration of lithium-ion battery 220C. As shown in FIG. 4, lithium-ion battery 220C includes series-connected 56 battery cells (14 cells×4 cells here) each having an output voltage of approximately 3 V to 4 V. The shape of the battery is not limited to the rectangular solid, and may be cylindrical shape or any of other shapes. The number of battery cells of which the battery pack is made up is not limited as well.

FIG. 5 shows an internal configuration of a battery module 400 made up of four battery cells in lithium-ion battery 220C of FIG. 4. The battery module is not limited to the one made up of four battery cells. As shown in FIG. 5, battery module 400 is configured by connecting four battery cells, namely battery cells 410, 420, 430, 440 in series for example. According to the present invention, the number of battery cells of which the battery module is made up may be one, or a plurality of battery cells such as four battery cells or battery cells of any number except for four may be used to form the battery module. The number of battery cells of which the battery module is made up is changed according to the number of battery cells of which the battery pack is made up, the number of rows of the battery cells in the battery pack and the number of cells per row for example.

Battery cells 410, 420, 430, 440 have respective upper surfaces where positive or negative terminals 412, 414, 422, 424, 432, 434, 442, 444 are provided that are used to connect the four battery cells in series.

Further, respective upper surfaces of battery cells 410, 420, 430, 440 are provided with safety valves 416, 426, 436, 446. These safety valves 416, 426, 436, 446 discharge gas that is internally generated when the lithium-ion battery is used in an abnormal state. For example, when an abnormal state of the battery occurs (battery is discharged with a large current or the battery is overcharged, for example), gas is generated in the battery so that the internal pressure of the battery could become an abnormally high pressure. When this state occurs, the safety valve is opened to discharge the gas, and the battery casing is thus prevented from being broken by the internal pressure.

The lithium-ion battery includes therein a temperature switch (temperature fuse) in order to block the current when the battery temperature increases to become an abnormally high temperature. The temperature switch is provided in the state of being in contact with the battery, for the purpose of accurately detecting the battery temperature. The temperature fuse is used as a temperature switch connected in series with the battery. Thus, when the battery temperature becomes an abnormally high temperature, the temperature fuse is rendered OFF to block the current. As the battery temperature decreases, the temperature fuse is rendered ON so that the fuse can be used again. This temperature switch is provided to each battery cell. The temperature switch is configured to send an ON signal to battery ECU 260 when the temperature of the battery cell becomes for example 85° C.

Further, a temperature sensor measuring the battery pack temperature of travel-purpose battery 220 is provided at a position of the worst temperature environment of travel-purpose battery (such as a position where cooling air flow is not appropriate and/or a position where the cooling air temperature is high).

Figure 6:
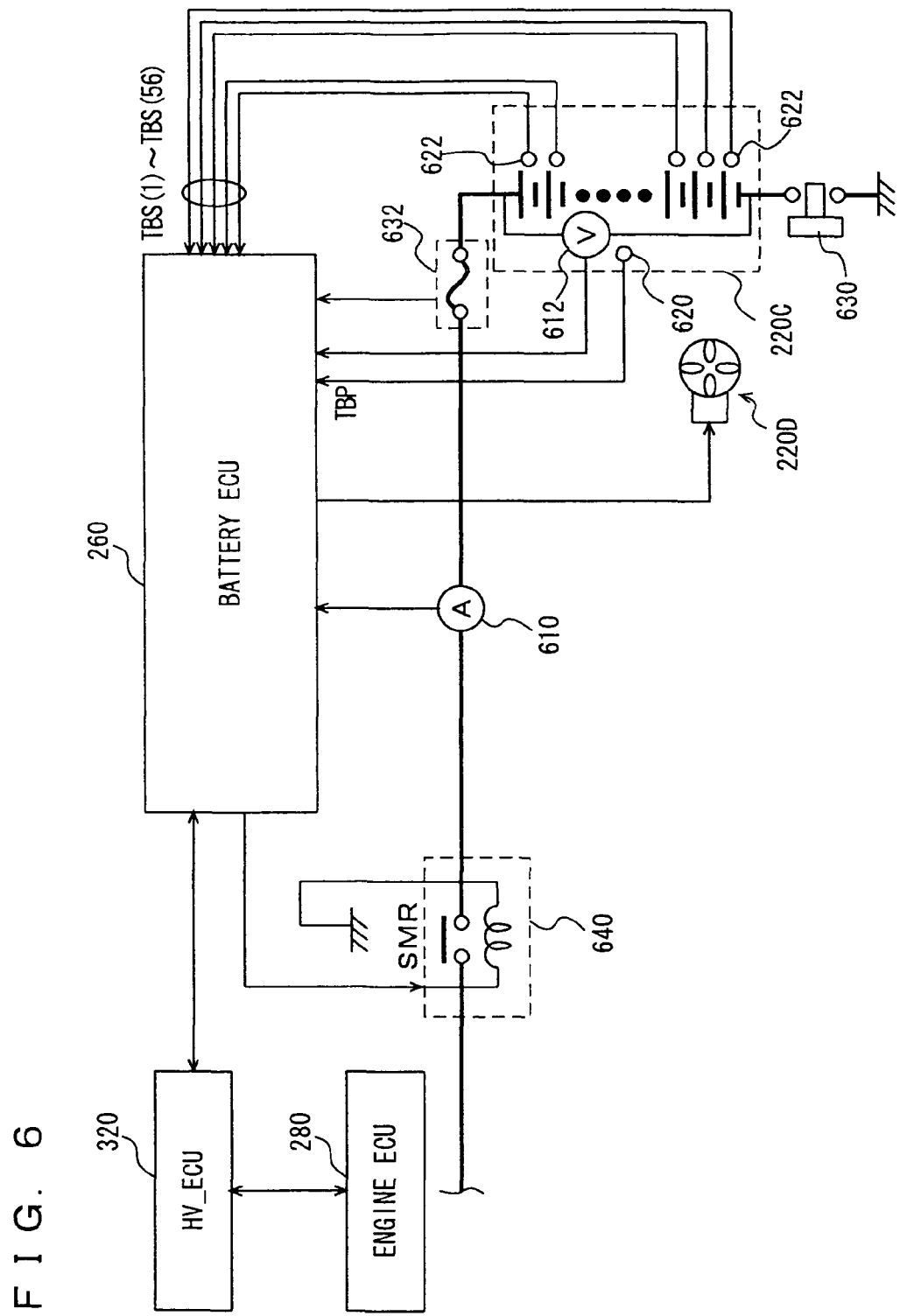
FIG. 6 is a control block diagram of a travel-purpose battery.

FIG. 6 shows a control block diagram of travel-purpose battery 220 controlled by battery ECU 260. As shown in FIG. 6, battery ECU 260 receives input of: a battery current value from a current sensor 610 detecting the current value of lithium-ion battery 220C (the value of the charge current to lithium-ion battery 220C and the value of the discharge current from lithium-ion battery 220C); a battery voltage value from a voltage sensor 612 detecting the voltage value of lithium-ion battery 220C; a battery temperature TBP from a temperature sensor 620 detecting the temperature of the battery pack of lithium-ion battery 220C; a fuse blowout signal from a battery fuse 630; and a signal from a temperature switch 622 (56 temperature switches in the present embodiment) that is rendered ON when a temperature TBS of each cell of lithium-ion battery 220C becomes higher than a set temperature (85° C.). Based on these signals, battery ECU 260 detects an abnormality of travel-purpose battery 220 and stores the detection as a diagnosis in a memory or the like in the ECU.

From battery ECU 260, an operation command signal is output to electrical battery cooling fan 220D, and an SMR ON signal and an SMR OFF signal are output to a system main relay (SMR) 640.

This hybrid vehicle further includes a service plug 630 that electrically disconnects travel-purpose battery 220C and each electrical device from each other by being mechanically detached when the vehicle maintenance is performed.

Further, to battery ECU 260, a signal line is connected in order to output a signal indicating that lithium-ion battery 220C is in an abnormal state to another ECU (such as HV_ECU 320 and engine ECU 280).

The control apparatus in the present embodiment that controls the hybrid vehicle mounted with travel-purpose battery 220 configured in the above-described manner has a feature that, when a battery abnormality is detected, the control apparatus changes the travel mode of the hybrid vehicle to a battery-less travel mode (the vehicle travels using engine 120 only) and, when a more serious (critical) battery abnormality occurs, shuts off the system to stop the hybrid vehicle. The control as described above can be implemented by hardware mainly configured with a digital circuit and/or analog circuit or by software mainly configured with a CPU and a memory included in the ECU and a program read from the memory and executed on the CPU. It is generally said that the control implemented with the hardware is advantageous in terms of the operating speed, while the control implemented with the software is advantageous in terms of design change. In the following, the case where the control apparatus is implemented with software will be described. It should be noted that a recording medium having such a program recorded thereon is also a form of the present invention.

Figure 7:
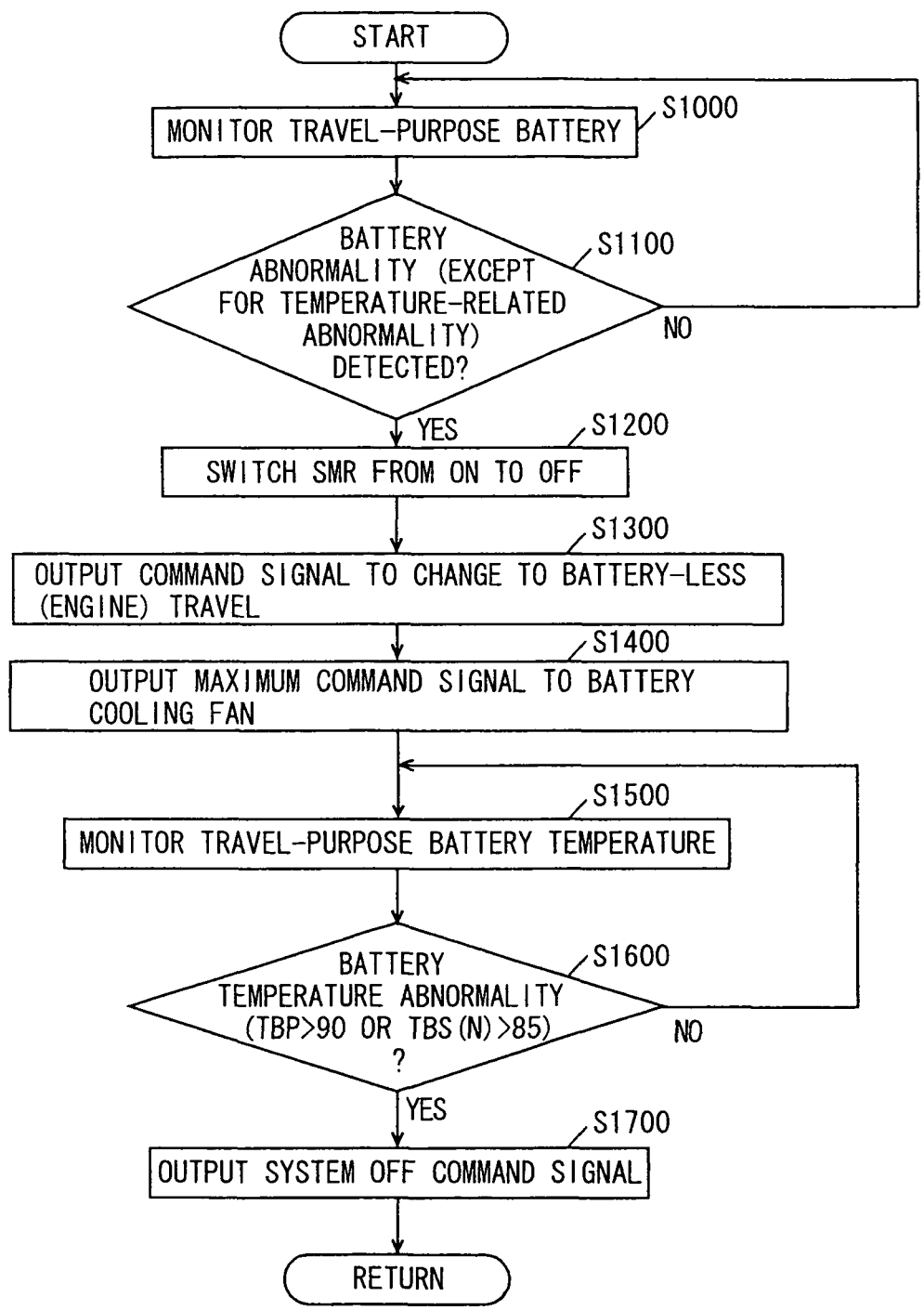
FIG. 7 is a flowchart showing a control structure of a first program executed by a battery ECU in FIG. 6.

Referring to FIG. 7, a description will be given of a control structure of a first program executed by battery ECU 260 that is the control apparatus in the present embodiment. The program is executed repeatedly with a predetermined cycle time. Further, the flowchart shown in FIG. 7 is supposed to be started after the system is started up, and the flowchart as shown ends with the system shutoff.

In step (hereinafter the step is abbreviated as S) 1000, battery ECU 260 monitors travel-purpose battery 220. Items to be monitored at this time are for example such items as the state of deterioration of the lithium-ion battery, the state of decrease in SOC, the state where the battery is discharged regardless of the fact that SOC is not larger than a control lower limit, the state of battery fuse 632, the state where a charge/discharge current value larger than an allowable value is detected, the state where the monitor unit itself (the monitor unit may include battery ECU 260) is abnormal, and the state where SOC exceeds a control upper limit.

In S1100, battery ECU 260 determines whether or not a battery abnormality is detected. The abnormality at this time does not include an abnormality in battery temperature. When battery ECU 260 detects a battery abnormality (YES in S1100), the process proceeds to S1200. Otherwise (NO in S1100), the process returns to S1000 where battery ECU 260 monitors travel-purpose battery 220. In view of the fact that this program is a subroutine, the entire process may be returned to a main routine in the case of NO in S1100. When a battery abnormality is detected, battery ECU 260 stores a diagnosis concerning the battery abnormality.

In S1200, battery ECU 260 outputs a command signal to SMR 640 so that SMR 640 is switched from ON to OFF. In S1300, battery ECU 260 outputs a command signal for changing the travel mode to the battery-less travel mode (traveling with engine 120 only) to HV_ECU 320. In S1400, battery ECU 260 outputs a command signal to electrical battery cooling fan 220D so that the cooling fan uses the maximum capacity (maximum air quantity) to cool travel-purpose battery 220.

In S1500, battery ECU 260 monitors the travel-purpose battery temperature. At this time, battery ECU 260 monitors the travel-purpose battery temperature based on battery pack temperature TBP or battery cell temperature TBS (N) (N=1 to 56).

In S1600, battery ECU 260 determines whether or not a battery temperature abnormality is detected. For example, when battery pack temperature TBP is higher than 90° C. or battery cell temperature TBS (N) (N=1 to 56) is higher than 85° C., battery ECU 260 determines that a battery temperature abnormality is detected. When battery ECU 260 detects a battery temperature abnormality (YES in S1600), the process proceeds to S1700. Otherwise (NO in S1600), the process returns to S1500 where battery ECU 260 monitors the temperature of travel-purpose battery 220. In view of the fact that this program is a subroutine, the entire process may be returned to the main routine in the case of NO in S1600.

In S1700, battery ECU 260 outputs a system-off command signal to HV_ECU 320.

Figure 8:
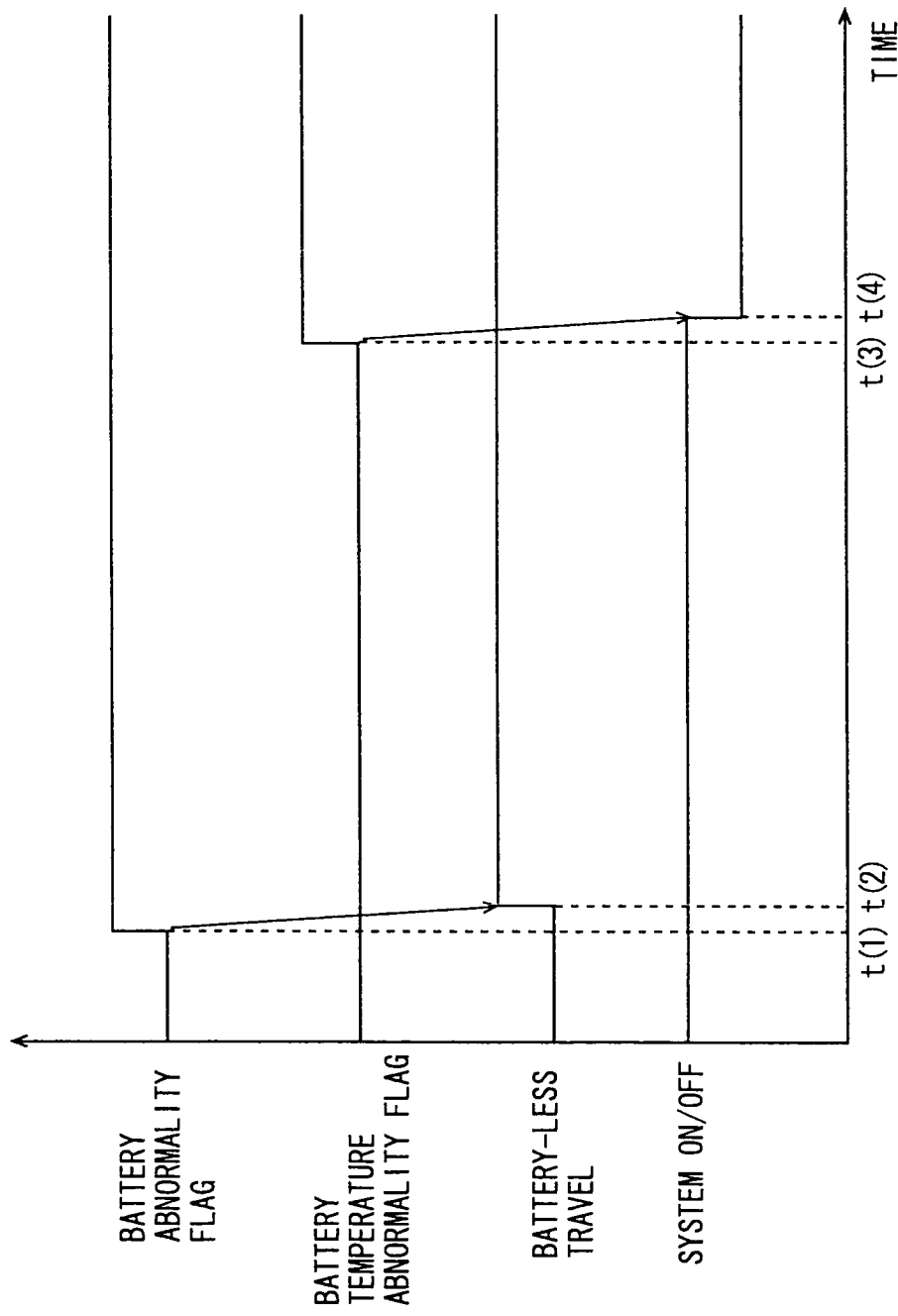
FIG. 8 is a timing chart showing an operation of the hybrid vehicle when the flowchart shown in FIG. 7 is executed.

With reference to FIG. 8, a description will be given of an operation of the hybrid vehicle mounted with travel-purpose battery 220 controlled by the control apparatus (ECU) in the present embodiment, based on the above-described structure and flowchart.

As a driver of the hybrid vehicle requests system startup (for example, presses a POWER switch (the name of the switch is given as an example) while depressing the brake pedal), SMR 640 becomes electrically connected and the state of the hybrid vehicle changes from a system-off state to a system-on state so that the hybrid vehicle becomes able to travel.

In the system-on state, travel-purpose battery 220 is monitored. Any battery abnormality (abnormality of deterioration of the lithium-ion battery for example) other than a battery temperature abnormality is detected (YES in S1100). This timing corresponds to time t (1) in FIG. 8.

SMR 640 is changed from the ON state to the OFF state (S1200), and a command signal for making a change to the battery-less travel mode (traveling with engine 120 only) is output to HV_ECU 320 (S1300). HV_ECU 320 outputs a command signal to engine ECU 2800 for starting operation if engine 120 is stopped. Thus, the travel mode of the hybrid vehicle is changed to the battery-less travel mode (traveling with engine 120 only). This timing corresponds to time t (2) in FIG. 8.

At this time, SMR 640 is electrically disconnected. Therefore, the electric power from travel-purpose battery 220 cannot be used. However, electric power for operating engine 120 (electric power for operating each ECU, electric power for operating the starter, electric power supplied to the spark plug, electric power for operating electrical battery cooling fan 220D for example) is supplied from an auxiliary battery (not shown).

A command signal is output to electrical battery cooling fan 220D so that the cooling fan uses the maximum capacity (maximum air quantity) to cool travel-purpose battery 220. In this state where travel-purpose battery 220 is electrically disconnected, the hybrid vehicle continues traveling using motive power from engine 120. Travel-purpose battery 220 is cooled to the maximum extent by electrical battery cooling fan 220D, without being charged/discharged. Therefore, normally the temperature of travel-purpose battery 220 should not increase.

Since travel-purpose battery 220 is electrically disconnected and the battery is not charged/discharged, no chemical reaction should occur in the lithium ion battery. However, by the temperature-abnormality monitoring of travel-purpose battery 220 (S1500), a battery temperature abnormality is detected (S1600). This timing corresponds to time t (3) in FIG. 8. At this time, if battery pack temperature TBP is higher than 90° C. and/or any one of battery cell temperatures TBS (N) (N=1 to 56) is higher than 85° C., a battery temperature abnormality is detected.

From the above fact that a temperature abnormality of travel-purpose battery 220 is detected in spite of the fact that travel-purpose battery 220 is electrically disconnected so that the hybrid vehicle travels with engine 120 only while travel-purpose battery 220 is cooled to the maximum extent, it is seen that the abnormality is a serious (critical) abnormality occurring to travel-purpose battery 220. Accordingly, the system of the hybrid vehicle is rendered OFF (S1700). This timing corresponds to time t (4) in FIG. 8. The hybrid vehicle thus becomes unable to travel. It is preferable to provide a delay time between time t (3) and time t (4) so that there is a time allowance for the driver to stop the hybrid vehicle at any safe place.

In the above-described manner, the control apparatus of the present embodiment changes the travel mode of the hybrid vehicle to the battery-less travel mode when a battery abnormality is detected while the hybrid system is operating. When a battery temperature abnormality is still detected in this state, the control apparatus renders the hybrid system OFF to surely stop the hybrid vehicle from traveling. In this way, the battery abnormality can be prevented from becoming a more critical state.

It should be noted that the system is not rendered OFF in the case where a battery abnormality (abnormality except for a temperature abnormality) different from the battery abnormality detected at time t (1) is detected between time t (2) and time t (3) in FIG. 8.

<First Modification>

A first modification of the present embodiment will be hereinafter described using FIGS. 9 and 10. A hybrid vehicle of the first modification is configured identically to the hybrid vehicle shown in FIGS. 1 to 6. Therefore, the description of FIGS. 1 to 6 will not be repeated here.

Figure 9:
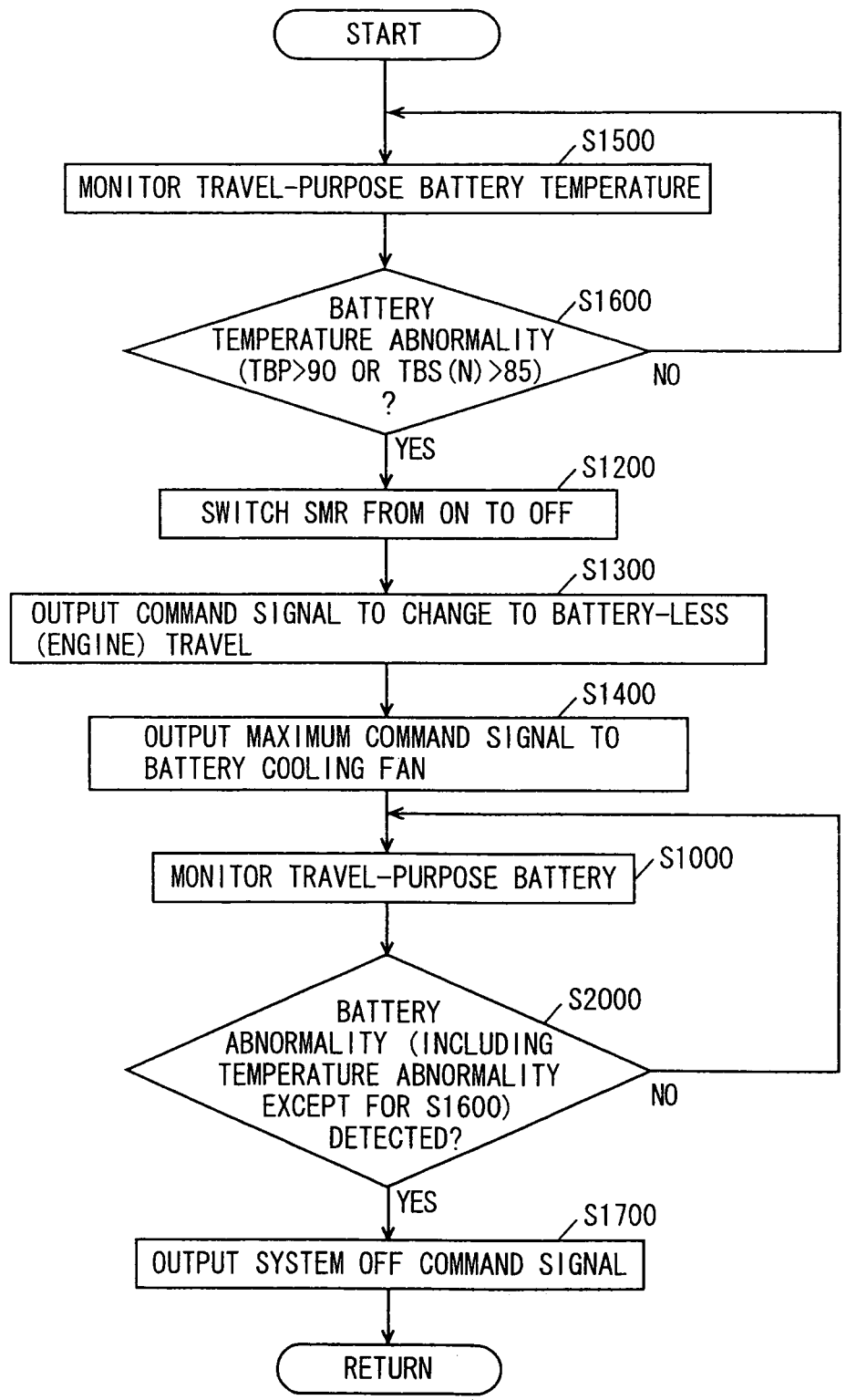
FIG. 9 is a flowchart showing a control structure of a second program executed by the battery ECU in FIG. 6.

Referring to FIG. 9, a description will be given of a control structure of a second program executed by battery ECU 260 that is a control apparatus of the present modification. This program is identical to that of the above-described embodiment in that the program is executed repeatedly with a predetermined cycle time. Further, the flowchart shown in FIG. 9 is also identical to that of the above-described embodiment in that the flowchart is supposed to be started after the system is started up, and the flowchart as shown ends with the system shutoff of the hybrid vehicle. Any step of the flowchart shown in FIG. 9 and the identical step of the flowchart shown in FIG. 7 are denoted by the same step numbers, and the steps are performed identically. Therefore, the detailed description of the steps will not be repeated here.

As shown in FIG. 9, battery ECU 260 that is the control apparatus of the present modification performs S1500 and S1600 in FIG. 7 first, and performs S2000 that is different from S1100. The steps other than S2000 are different from those in FIG. 7 in terms of the order only, and the description thereof will not be repeated here.

In S2000, battery ECU 260 determines whether or not a battery abnormality is detected. The abnormality here includes abnormality items to be monitored in S1000, namely, the state of deterioration of the lithium-ion battery, the state of decrease in SOC, the state where the battery is discharged regardless of the fact that SOC is not larger than a control lower limit, the state of battery fuse 632, the state where a charge/discharge current value larger than an allowable value is detected, the state where the monitor unit itself (the monitor unit may include battery ECU 260) is abnormal, and the state where SOC exceeds a control upper limit, and additionally a battery temperature abnormality except for the one detected in S1600. For example, if battery ECU 260 detects an abnormality in battery pack temperature TBP in S1600, an abnormality detected in S2000 includes an abnormality in battery cell temperature TBS (N) (N=1 to 56) (this may be vice versa although set forth in confirmatory manner). When battery ECU 260 detects a battery abnormality (YES in S2000), the process proceeds to S1700. Otherwise (NO in S2000), the process returns to S1000 where battery ECU 260 monitors travel-purpose battery 220. When battery ECU 260 detects a battery abnormality, the battery ECU stores a diagnosis concerning the battery abnormality.

Figure 10:
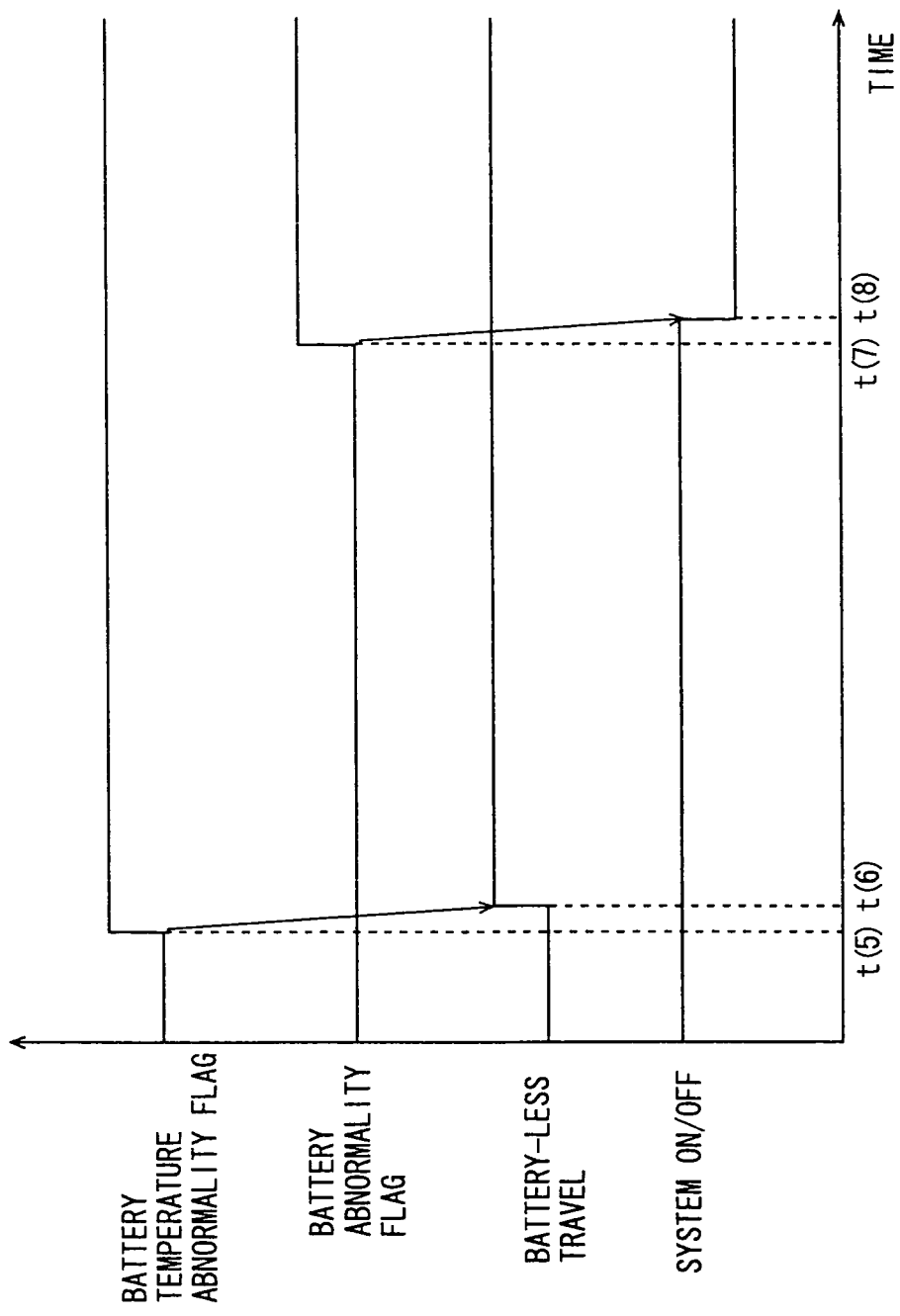
FIG. 10 is a timing chart showing an operation of the hybrid vehicle when the flowchart shown in FIG. 9 is executed.

With reference to FIG. 10, a description will be given of an operation of the hybrid vehicle mounted with travel-purpose battery 220 controlled by the control apparatus (ECU) of the present embodiment, based on the above-described structure and flowchart. As to the description of FIG. 10, the description of the same operation as the operation described in connection with FIG. 8 will not be repeated.

In the state where the hybrid vehicle is in a system-on state, the temperature of travel-purpose battery 220 is monitored (S1500). A battery temperature abnormality is detected (YES in S1600). This timing corresponds to time t (5) in FIG. 10. At this time, if battery pack temperature TBP is higher than 90° C. or any one of battery cell temperatures TBS (N) (N=1 to 56) is higher than 85° C., a battery abnormality is detected.

SMR 640 is switched from the ON state to the OFF state (S1200), and a command signal to change the travel mode to the battery-less travel mode (traveling with engine 120 only) is output to HV_ECU 320 (S1300). HV_ECU 320 outputs to engine ECU 280 a command signal so that the operation is started if engine 120 is stopped. Then, the travel mode of the hybrid vehicle is changed to the battery-less travel mode (traveling with engine 120 only). This timing corresponds to time t (6) in FIG. 10.

A command signal is output to electrical battery cooling fan 220D so that the cooling fan uses the maximum capacity (maximum air quantity) to cool travel-purpose battery 220. In this state where travel-purpose battery 220 is thus electrically disconnected, the hybrid vehicle continues traveling with the motive power of engine 120. Travel-purpose battery 220 is cooled to the maximum extent by electrical battery cooling fan 220D without being charged/discharged. Therefore, the temperature of travel-purpose battery 220 should not normally increase.

Since travel-purpose battery 220 is electrically disconnected and the battery is not charged/discharged, no chemical reaction should occur in the lithium-ion battery. Regardless of this, an abnormality of travel-purpose battery 220 is monitored (S1000) and accordingly a battery abnormality including a battery temperature abnormality except for the one detected in S1600 is detected (S2000). This timing corresponds to time t (7) in FIG. 10.

From the above fact that a temperature abnormality of travel-purpose battery 220 is detected in spite of the fact that travel-purpose battery 220 is electrically disconnected so that the hybrid vehicle travels with engine 120 only while travel-purpose battery 220 is cooled to the maximum extent, it is seen that the abnormality is a serious (critical) abnormality occurring to travel-purpose battery 220. Accordingly, the system of the hybrid vehicle is rendered OFF (S1700). This timing corresponds to time t (8) in FIG. 10. In this way, the hybrid vehicle becomes unable to travel.

In the above-described manner, the control apparatus of the present embodiment changes the travel mode of the hybrid vehicle to the battery-less travel mode when a battery temperature abnormality is detected while the hybrid system is operating. If a battery abnormality is still detected in this state, the control apparatus renders the hybrid system OFF to surely stop the hybrid vehicle from traveling. In this way, the battery abnormality is prevented from becoming a serious state.

<Second Modification>

A second modification of the present embodiment will be hereinafter described using FIGS. 11 and 12. A hybrid vehicle of the second modification is configured identically to the hybrid vehicle shown in FIGS. 1 to 6. Therefore, the description of FIGS. 1 to 6 will not be repeated here.

Figure 11:
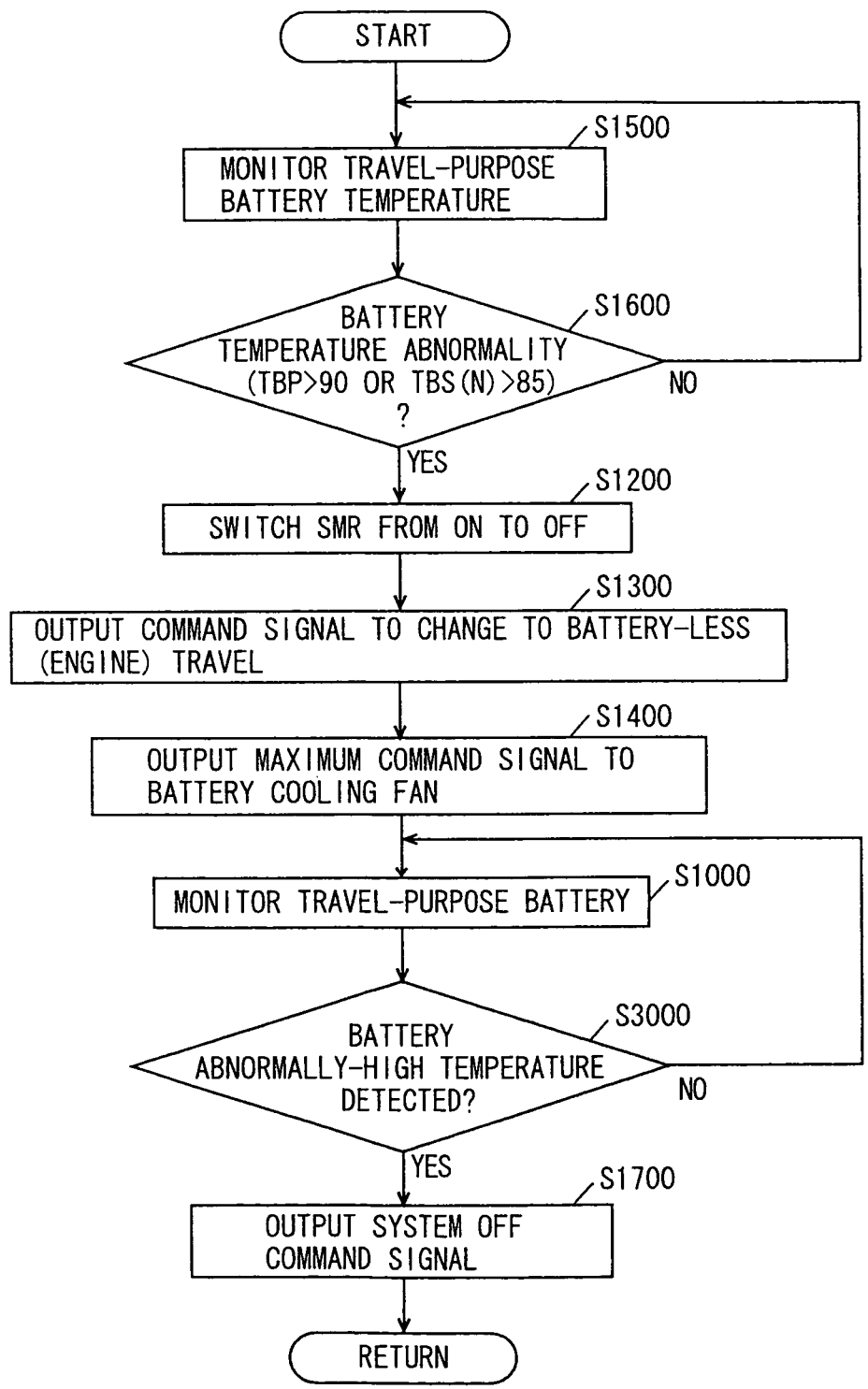
FIG. 11 is a flowchart showing a control structure of a third program executed by the battery ECU in FIG. 6.

Referring to FIG. 11, a description will be given of a control structure of a third program executed by battery ECU 260 that is a control apparatus of the present modification. This program is identical to those of the above-described embodiment and first modification in that the program is executed repeatedly with a predetermined cycle time. The flowchart shown in FIG. 11 is also identical to those of the above-described embodiment and first modification in that the flowchart is supposed to be started after the system is started up, and the flowchart as shown ends with the system shutoff of the hybrid vehicle. Further, any step of the flowchart shown in FIG. 11 and the identical step of the flowchart shown in FIG. 7 or 9 are denoted by the same step numbers. The steps are performed identically. Therefore, the detailed description of the steps will not be repeated.

As shown in FIG. 11, battery ECU 260 that is the control apparatus of the present modification executes the step S3000 different from S2000 in FIG. 9. Since the steps other than S3000 are identical to those of FIG. 9, the description thereof will not be repeated here.

In S3000, battery ECU 260 determines whether or not an abnormally high temperature of the battery is detected. For example, when battery pack temperature TBP becomes 94° C. to 95° C. (the temperatures are presented by way of example), battery ECU 260 detects that the temperature of the battery is abnormally high. When battery ECU 260 detects an abnormally high temperature of the battery (YES in S3000), the process proceeds to S1700. Otherwise (NO in S3000), the process returns to S1000 where battery ECU 260 monitors travel-purpose battery 220. In the case where battery ECU 260 detects an abnormally high temperature of the battery, battery ECU 260 stores a diagnosis concerning the abnormally high temperature of the battery.

With reference to FIG. 12, a description will be given of an operation of the hybrid vehicle mounted with travel-purpose battery 220 controlled by the control apparatus (ECU) of the present embodiment, based on the above-described structure and flowchart. In the description of FIG. 12, the description of the same operation as that of FIG. 8 or 10 will not be repeated.

While the hybrid vehicle is in the system-on state, the temperature of travel-purpose battery 220 is monitored (S1500). A battery temperature abnormality is detected (YES in S1600). This timing corresponds to time t (9) in FIG. 12. At this time, if battery pack temperature TBP is higher than 90° C. or any one of battery cell temperatures TBS (N) (N=1 to 56) is higher than 85° C., a battery temperature abnormality is detected.

SMR 640 is switched from the ON state to the OFF state (S1200), and a command signal for making a change to the battery-less travel mode (traveling with engine 120 only) is output to HV_ECU 320 (S1300). HV_ECU 320 outputs a command signal to engine ECU 280 to start the operation if engine 120 is stopped. Accordingly, the travel mode of the hybrid vehicle is changed to the battery-less travel (traveling with engine 120 only). This timing corresponds to time t (10) in FIG. 10

A command signal is output to electrical battery cooling fan 220D so that travel-purpose battery 220 is cooled with the maximum capacity (maximum air quantity). In this state where travel-purpose battery 220 is electrically disconnected, the hybrid vehicle continues traveling using the motive power of engine 120. Travel-purpose battery 220 is cooled to the maximum extent by electrical battery cooling fan 220D without being charged/discharged. Therefore, the temperature of travel-purpose battery 220 should not normally increase.

Since travel-purpose battery 220 is electrically disconnected and is not charged/discharged, no chemical reaction should occur in the lithium-ion battery. However, an abnormally high temperature of the battery is detected (S3000) through abnormality monitoring of travel-purpose battery 220 (S1000). This timing corresponds to time t (11) in FIG. 12.

From the above fact that an abnormally high temperature of travel-purpose battery 220 is detected in spite of the fact that travel-purpose battery 220 is electrically disconnected so that the hybrid vehicle travels with engine 120 only while travel-purpose battery 220 is cooled to the maximum extent, it is seen that the abnormality is a serious (critical) abnormality occurring to travel-purpose battery 220. Accordingly, the system of the hybrid vehicle is rendered OFF (S1700). This timing corresponds to time t (12) in FIG. 12. In this way, the hybrid vehicle becomes unable to travel.

In the above-described manner, the control apparatus of the present embodiment thus changes the travel mode of the hybrid vehicle to the battery-less travel mode when a battery temperature abnormality is detected while the hybrid system is operating. If an abnormally high temperature of the battery is still detected in this state, the control apparatus renders the hybrid system OFF to surely stop the hybrid vehicle from traveling. In this way, the battery abnormality is prevented from becoming a more serious state.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

The invention claimed is:

1. A control apparatus for a hybrid vehicle including an internal combustion engine and an electrical motor each as a travel source for the hybrid vehicle and including a power storage device supplying electric power to said electrical motor, said control apparatus comprising:
   a detection unit configured to detect an abnormality, other than a temperature-related abnormality, of said power storage device;
   a vehicle control unit configured to control said hybrid vehicle such that said power storage device is electrically disconnected from an electrical load including said electrical motor and said hybrid vehicle travels using said internal combustion engine as said travel source instead of said electrical motor, when said detection unit detects the abnormality; and
   an inhibition unit configured to inhibit said hybrid vehicle from traveling using said internal combustion engine by shutting down said internal combustion engine, when a temperature-related abnormality of said power storage device is detected while said hybrid vehicle is traveling using said internal combustion engine instead of said electrical motor.

2. The control apparatus for a hybrid vehicle according to claim 1, wherein
   said power storage device is cooled by a cooling apparatus mounted on said hybrid vehicle, and
   said control apparatus further comprises a cooling control unit for controlling said cooling apparatus such that said cooling apparatus uses a maximum capacity to cool said power storage device while said hybrid vehicle is traveling using said internal combustion engine as the travel source instead of said electrical motor.

3. A control apparatus for a hybrid vehicle including an internal combustion engine and an electrical motor each as a travel source for the hybrid vehicle and including a power storage device supplying electric power to said electrical motor, said control apparatus comprising:
   detection means for detecting an abnormality, other than a temperature-related abnormality, of said power storage device;
   control means for controlling said hybrid vehicle such that said power storage device is electrically disconnected from an electrical load including said electrical motor and said hybrid vehicle travels using said internal combustion engine as said travel source instead of said electrical motor, when said detection means detects the abnormality; and
   inhibition means for inhibiting said hybrid vehicle from traveling using said internal combustion engine by shutting down said internal combustion engine, when a temperature-related abnormality of said power storage device is detected while said hybrid vehicle is traveling using said internal combustion engine instead of said electrical motor.

4. The control apparatus for a hybrid vehicle according to claim 3, wherein
   said power storage device is cooled by a cooling apparatus mounted on said hybrid vehicle, and
   said control apparatus further comprises means for controlling said cooling apparatus such that said cooling apparatus uses a maximum capacity to cool said power storage device while said hybrid vehicle is traveling using said internal combustion engine as the travel source instead of said electrical motor.

5. A control method for a hybrid vehicle including an internal combustion engine and an electrical motor each as a travel source for the hybrid vehicle and including a power storage device supplying electric power to said electrical motor, said control method comprising the steps of:
- detecting an abnormality, other than a temperature-related abnormality, of said power storage device;
- controlling said hybrid vehicle such that said power storage device is electrically disconnected from an electrical load including said electrical motor and said hybrid vehicle travels using said internal combustion engine as said travel source instead of said electrical motor, when said step of detecting detects the abnormality; and
- inhibiting said hybrid vehicle from traveling using said internal combustion engine by shutting down said internal combustion engine, when a temperature-related abnormality of said power storage device is detected while said hybrid vehicle is traveling using said internal combustion engine instead of said electrical motor.

6. The control method for a hybrid vehicle according to claim 5, wherein
- said power storage device is cooled by a cooling apparatus mounted on said hybrid vehicle, and
- said control method further comprises the step of controlling said cooling apparatus such that said cooling apparatus uses a maximum capacity to cool said power storage device while said hybrid vehicle is traveling using said internal combustion engine as the travel source instead of said electrical motor.

* * * * *